United States Patent [19]

Magara et al.

[11] Patent Number: 5,183,986
[45] Date of Patent: Feb. 2, 1993

[54] WIRE-TYPE ELECTRIC DISCHARGE MACHINING SYSTEM CAPABLE MAGNETICALLY OF COLLECTING MATERIAL THAT HAS BEEN REMOVED FROM A WORKPIECE AND CONFIRMING THE MAGNETIC ATTRACTION

[75] Inventors: Takuji Magara; Masahiro Yamamoto, both of Aichi, Japan

[73] Assignee: Mitsubishi Denki K.K., Tokyo, Japan

[21] Appl. No.: 772,797

[22] Filed: Oct. 8, 1991

[30] Foreign Application Priority Data

Oct. 8, 1990 [JP] Japan .................. 2-269902
Mar. 8, 1991 [JP] Japan .................. 3-43062

[51] Int. Cl.⁵ .................. B23H 7/02; B23H 11/00
[52] U.S. Cl. .................. 219/69.12; 269/8
[58] Field of Search .......... 219/69.12, 69.17; 204/297 M; 269/8, 20

[56] References Cited

U.S. PATENT DOCUMENTS

| | | | |
|---|---|---|---|
| 4,484,052 | 11/1984 | Inoue | 219/69.12 |
| 4,745,253 | 5/1988 | Girardin | 219/69.12 |
| 4,996,406 | 2/1991 | Nakayama | 219/69.12 |
| 5,015,814 | 5/1991 | Morishita | 269/8 |

FOREIGN PATENT DOCUMENTS

| | | |
|---|---|---|
| 0194353 | 9/1986 | European Pat. Off. |
| 3641701 | 6/1987 | Fed. Rep. of Germany |
| 2467155 | 4/1981 | France |
| 63-22220 | 9/1988 | Japan |

OTHER PUBLICATIONS

Patent Abstracts of Japan, vol. 9, No. 261, Oct. 18, 1985, & JP-A-60 108 217.

Primary Examiner—Geoffrey S. Evans
Attorney, Agent, or Firm—Sughrue, Mion, Zinn, Macpeak & Seas

[57] ABSTRACT

A wire-type electric discharge machining apparatus capable of attracting material from a workpiece to an integral electromagnet. An aperture is located proximate the electromagnet. When material is attracted by the electromagnet, the aperture will be obstructed. Attraction is confirmed by measuring the pressure in a chamber in communication with the aperture, such that a low pressure indicates obstruction, and thus attraction of the material to the electromagnet. If based on this measurement it appears that the material has not been attracted to the electromagnet, a further attempt is made at a different location of attraction.

13 Claims, 7 Drawing Sheets

WIRE-TYPE ELECTRIC DISCHARGE MACHINING SYSTEM CAPABLE MAGNETICALLY OF COLLECTING MATERIAL THAT HAS BEEN REMOVED FROM A WORKPIECE AND CONFIRMING THE MAGNETIC ATTRACTION

SUMMARY OF THE INVENTION

1. Field of the Invention

The present invention relates to a wire-type electronic discharge machining (EDM) system incorporating an improved mechanism for collecting material, such as a core cut from a workpiece.

2. Description of the Related Art

Figure 7:
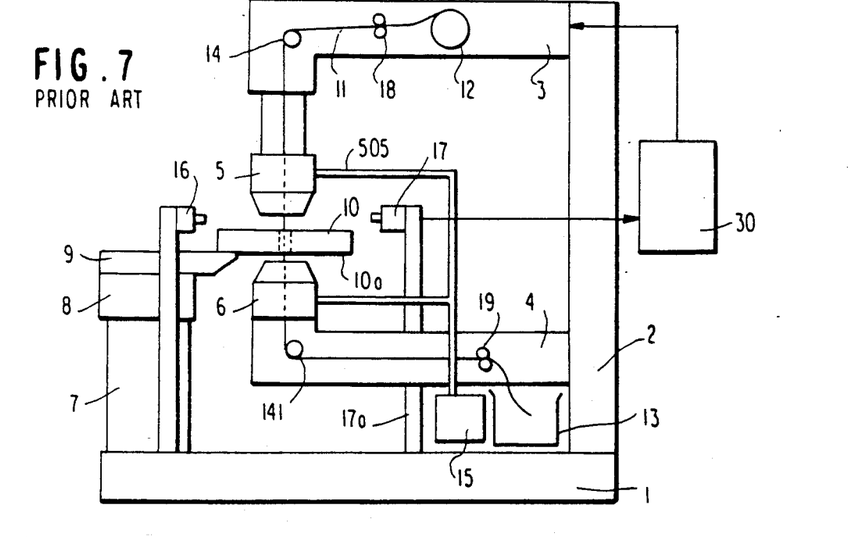
FIG. 7 shows the overall structure of a conventional wire-type electronic discharge machining system.

FIG. 7 illustrates a conventional wire-type electric discharge machining system. Base 1 provides support for column 2. Upper arm 3 is rotatably mounted on column 2 and lower arm 4 is also supported by column 2. Upper nozzle 5 is attached to upper arm 3 so as to be movable relative to upper arm 3 in a vertical direction. Upper nozzle 5 is designed to provide a jet of machining liquid dielectric, or the like, in a manner well known in the art of EDM. Lower nozzle 6 is supported by lower arm 4. Lower nozzle 6 is also designed to provide a jet of machining dielectric or the like.

Support table 7 is mounted on base 1 and X-Y table 8 is supported on support table 7 so as to be movable in vertical and horizontal directions. Workpiece mount 9 is fixedly attached to X-Y table 8 and the workpiece is removably mounted in workpiece mount 9.

Wire electrode 11 is utilized as a tool for machining in a conventional manner. Bobbin 12, around which electrode 11 is wound, is rotatably mounted to column 2 so as to continuously feed electrode 11 to an area proximate workpiece 10. Collection box 13 serves to collect electrode 11 after it has passed through a machining position. Pulleys 14 and 141 guide electrode 11 to and from a machining position and also serve to change the direction of movement of electrode 11.

Machining liquid feed pump 15 feeds the machining liquid to upper nozzle 5 and lower nozzle 6 through feed pipe 505. Press rollers 18 and feed rollers 19 are mounted to upper arm 3 and lower arm 4 respectively so as to control the speed of advancement of electrode 11.

Upper nozzle 5 has opening 5a through which a jet of machining liquid is applied. Similarly, lower nozzle 6 has opening 6a through which a jet of machining liquid is applied. Openings 5a and 6a are placed in opposing relationship to each other.

In order to collect a piece of material cut from workpiece 10 (in a manner described below), upper nozzle 5 has electromagnet 5b at its lower portion which is capable of attracting the material cut from workpiece 10 after a machining operation (see FIG. 8). Light source 16 and photosensor 17 are positioned such that the material to be removed from the workpiece, typically a core cut from the workpiece and referred to herein as a "core" or "core material", is brought into line with light traveling from light source 16 to photosensor 17 when the core material is moved up by upper nozzle 5 while it is being attracted to electromagnet 5b. Nozzle position controller 30 receives an output signal from photosensor 17 and provides an output to servo motors, or the like, (not illustrated) so as to control the position of upper nozzle 5 in response to the output signal.

Figure 8:
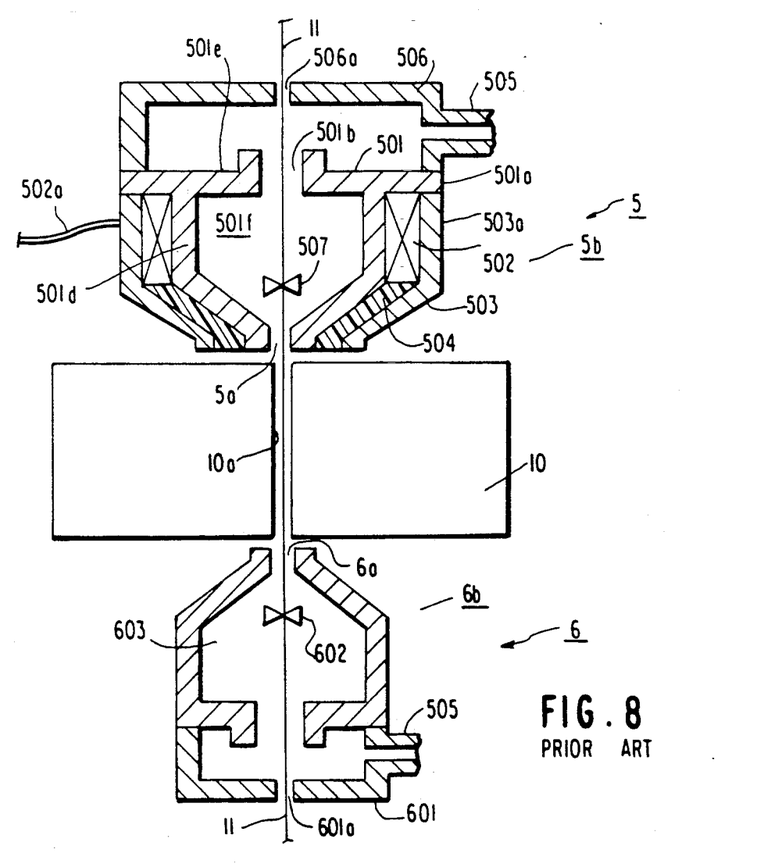
FIG. 8 is a sectional view showing the major parts of the system illustrated in FIG. 7.

FIG. 8 is a partial sectional view of upper nozzle 5, workpiece 10, and the lower nozzle 6 of a conventional wire-type EDM system. Electromagnet 5b consists of inner core 501 made from a ferrous material and including generally cylindrical portion 501d, top portion 501e, and flange portion 501a extending radially outwardly from the upper end of the cylindrical portion 501d. Top portion 501a has opening 501b formed therein, and cylindrical portion 501d has opening 5a formed at its lower end.

Electrode 11 extends through both openings 501b and 5a. A machining liquid flows into inner core 501 through opening 501b and out of opening 5a. Coil 502 is wound around inner core 501 so as to provide a magnetic field force when energized with an electrical current via conductor 502a.

Outer core 503 is also made from a ferrous material, or the like, and surrounds coil 502 in concentric relation to inner cylindrical portion 501d. Resin 504 is disposed between the lower portion of outer core 503 and the lower portion of inner core 501.

Connecting portion 506 is located between feed pipe 505 and inner core 501 so as to carry machining liquid from feed pipe 505 to hollow portion 501f of inner core 501. Connecting portion 506 has opening 506a at its upper end through which wire electrode 11 extends.

A jet of machining liquid is applied through opening 6a formed at the upper end of lower nozzle 6. Second connecting portion 601 directs the machining liquid from feed pipe 505 to nozzle portion 6b of lower nozzle 6. Connecting portion 601 has opening 601a at its lower end through which electrode 11 extends.

Guide members 507 and 602 are mounted within hollow portion 501f of inner core 501 and hollow portion 603 respectively so as to guide electrode 11 along a feed path adjacent to workpiece 10 in a desired manner.

In operation, prior to a machining cycle, workpiece 10 is removably mounted to mount 9. As shown in FIG. 7, electrode 11 is fed from supply bobbin 12, between press rollers 18, around pulley 14, through opening 5a, through hole 10a previously formed in workpiece 10, through opening 6a around pulley 141, between feed rollers 19, and finally into wire electrode collection box 13.

Feed pump 15 is then operated so as to direct jets of machining liquid through openings 5a and 6a while a voltage potential is intermittently applied between workpiece 10 and electrode 11 so as to provide intermittent electronic discharges. The energy of these discharges cuts workpiece 10 at areas proximate electrode 11 in a conventional manner. At this time, X-Y table 8 is moved in accordance with a predetermined program so as to machine workpiece 10 into a predetermined shape by virtue of electric discharge machining techniques. When a desired cut is made, the electrical potential is removed.

Figure 9:
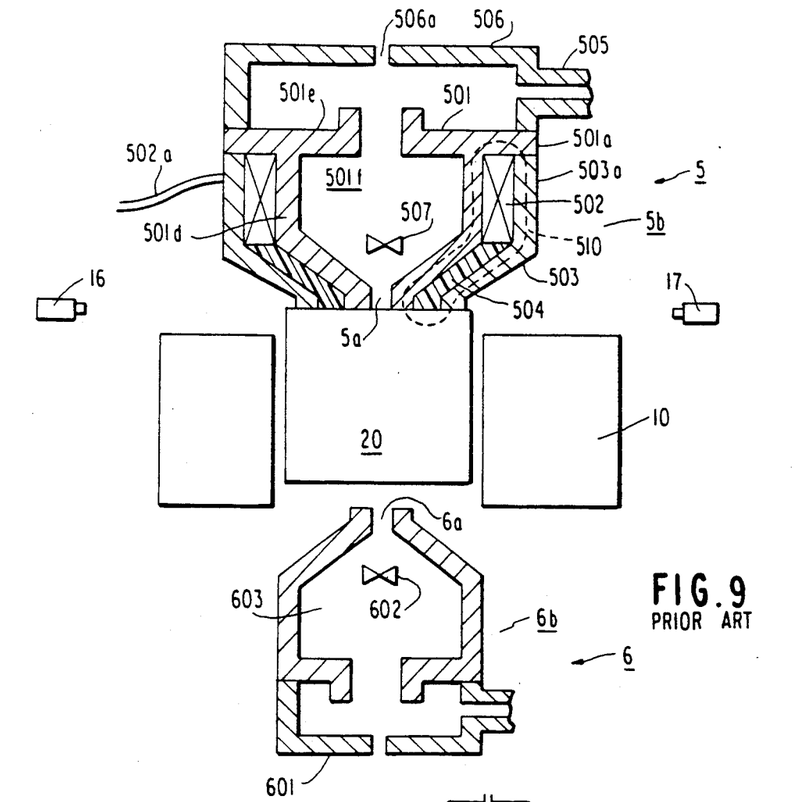
FIG. 9 illustrates how a core material is attracted to an electromagnet in a conventional system.

Feed pump 15 is now rendered inoperative so that the machining liquid is no longer supplied to upper nozzle 5 and lower nozzle 6. Then, electrode 11 is cut. Electromagnet 5b is thereafter moved toward the material defined by the cut and an electric current is applied to coil 502 so as to attract the material 20 as shown in FIG. 9. Nozzle position controller 30 commands upper nozzle 5 to move in an upward direction (via servo motors, or the like).

The attraction of the core material to electromagnet 5b is confirmed by photosensor 17 as follows. Coil 502 is first magnetized while the end of the electromagnet 5b is moved toward material 20. As shown in FIG. 9, upper nozzle 5 is then moved up until the lower surface of material 20 is above the upper surface of workpiece 10. If material 20 is raised by electromagnet 5b, light from light source 16 is interrupted by the core material 20 and cannot reach the photosensor 17. On the other hand, if the material 20 is not attracted, or if the material 20 is attracted and then dropped, light from light source 16 can reach photosensor 17.

Figure 10:
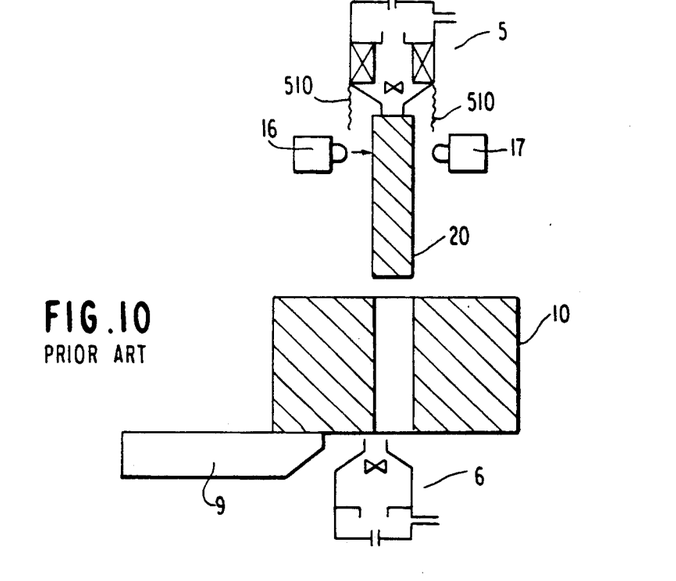
FIG. 10 illustrates how a conventional system operates after the removed material has been attracted to the electromagnet.

Thus, whether or not material 20 is attracted to electromagnet 5b can be readily determined based upon the output of photosensor 17. When photosensor 17 detects that material 20 is not fixed to electromagnet 5b while upper nozzle 5 is being moved upward, the system operation is interrupted and an alarm is sounded. When core material 20 is fixed to electromagnet 5b, nozzle position controller 30 sends instructions to the nozzle servos (not shown) to move electromagnet 5b. Upper arm 3 is then rotated to transfer core material 20 to a core material collection box (not shown). The application of electric current to electromagnet 5b is terminated at this time so that core material 20 is dropped into the collection box. Under the control of nozzle position controller 30, upper arm 3 is thereafter rotated in a reverse direction and returned to its initial position for the next cycle of operation.

In the above-described conventional wire-type electric discharge machining system, the position and angle of light source 16 and photosensor 17 must be precisely set so that core material 20, when fixed to electromagnet 5b, obstructs a path along which light is emitted from light source 16 to photosensor 17. However, the position and angle of light source 16 and photosensor 17 are subject to change, for example, when the system is erroneously operated, and core material 20 comes into contact therewith, or when a force is applied to light source 16 and the photosensor 17 by the operator's hands, vibrations, etc. Also, light source 16 and photosensor 17 must precisely be mounted since the core material 20 is typically of a very small size. Accordingly, periodic position adjustment is required in order to avoid malfunctions in the system. A further problem with the conventional system is that detection can only be effected in one fixed position. Also, covers usually surround upper nozzle 5 so as to prevent the machining liquid from splashing. However, covers or other associated devices serve to limit positions in which photosensor 17 and light source 16 can be mounted. This makes system design difficult.

In addition, the conventional wire-type EDM system cannot detect separation of core material 20 from electromagnet 5b during a transfer operation to the collection box. Accordingly, the machine will continue to operate after removed material has been dropped improperly. This may result in damage to the system.

Also, the conventional system cannot detect when electromagnet 5b is positioned close to material 24. Accordingly, movement of electromagnet 5b will not be stopped even if electromagnet 5b is inadvertently moved so as to collide with material 20. This can result in damage to electromagnet 5b.

SUMMARY OF THE INVENTION

The present invention was conceived in an effort to solve the foregoing problems and, accordingly, it is an object of the present invention to provide a wire-type electric discharge machining system which can consistently detect whether removed material is fixed to the electromagnet even if the removed material is small in size. It is another object of the present invention to provide a wire-type electric discharge machining system which can consistently detect whether the removed material is fixed to the electromagnet at all positions of travel thereof and which prevents the electromagnet from undesirably impinging upon the removed material.

Accordingly, the present invention is a wire-type electric discharge machining system which has an electromagnet operable to attract a material removed from a workpiece during a machining operation, and an air inlet port that is movable in concert with the electromagnet, so that introduction of air through the air inlet port is inhibited when core material is attached to the electromagnet. A vacuum device creates a vacuum in an air chamber that is in communication with the air inlet port. A pressure gauge is provided for measuring pressure in the air chamber. A controller determines whether or not the material is attached to the electromagnet based on the measurement taken by the pressure gauge.

Also, the controller can determine, based upon the output of the pressure gauge, when the electromagnet is close to the material so as to stop the movement of the electromagnet before damage is sustained thereby.

DETAILED DESCRIPTION OF THE PREFERRED EMBODIMENTS

The present invention will now be described by way of preferred embodiments illustrated in the appended drawings.

Figure 1:
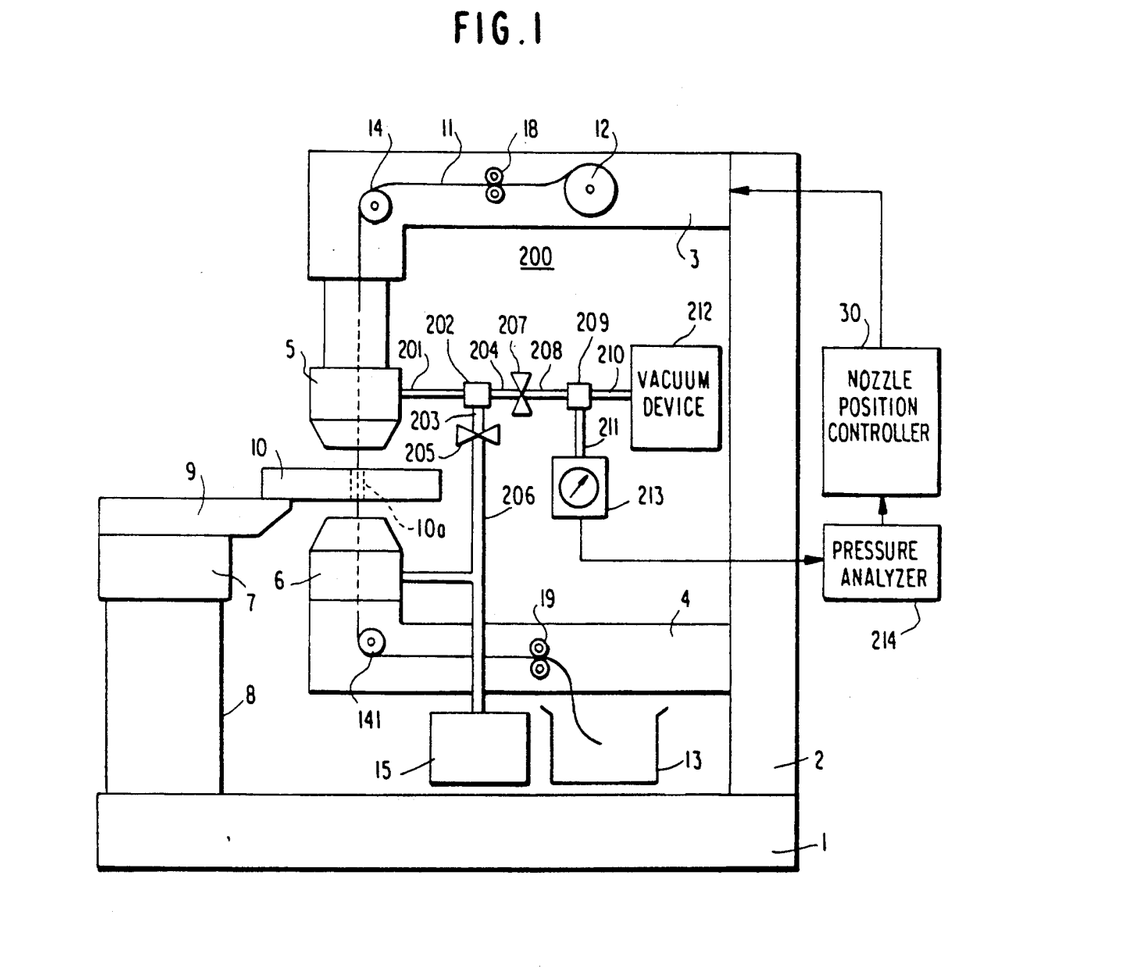
FIG. 1 illustrates a wire-type electric discharge machining system in accordance with a first embodiment of the present invention.

FIG. 1 illustrates the overall structure of the first preferred embodiment. Elements that operate similarly to corresponding elements in the conventional machine are indicated by like reference numerals and will not be explained further. First pressure analyzer 214 is capable of determining whether or not material 20 is abutted against electromagnet 5b of upper nozzle 5, or close thereto, based upon output information of pressure gauge 213. The output of first pressure analyzer 214 is sent to first nozzle position controller 30.

Figure 2:
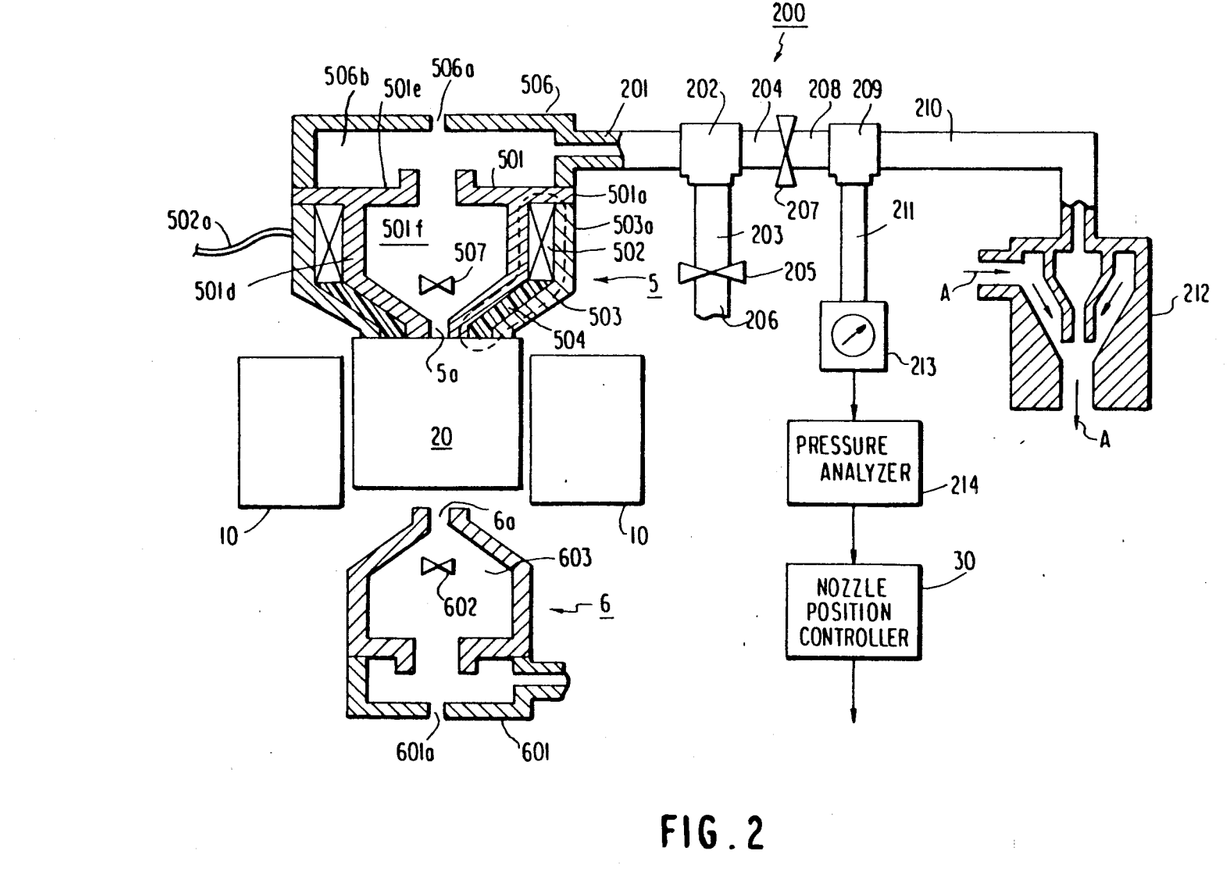
FIG. 2 is a sectional view showing the main parts of the embodiment illustrated in FIG. 1.

FIG. 2 illustrates the novel configuration of nozzle 5 of the present invention. Vacuum device 212 communicates with hollow portion 501 of upper nozzle 5. Accordingly, vacuum device 212 creates lower pressure inside the air chamber of nozzle 5 when operated. Vacuum gauge 213 monitors pressure within the air chamber by virtue of conduit 211.

Pressure analyzer 214 receives an input signal from pressure gauge 213 and outputs a signal to nozzle position controller 30. Nozzle position controller 30 operates servos (not illustrated) so as to position upper nozzle 5 in a desired manner. Operation of these elements will be described in detail below.

Figure 3:
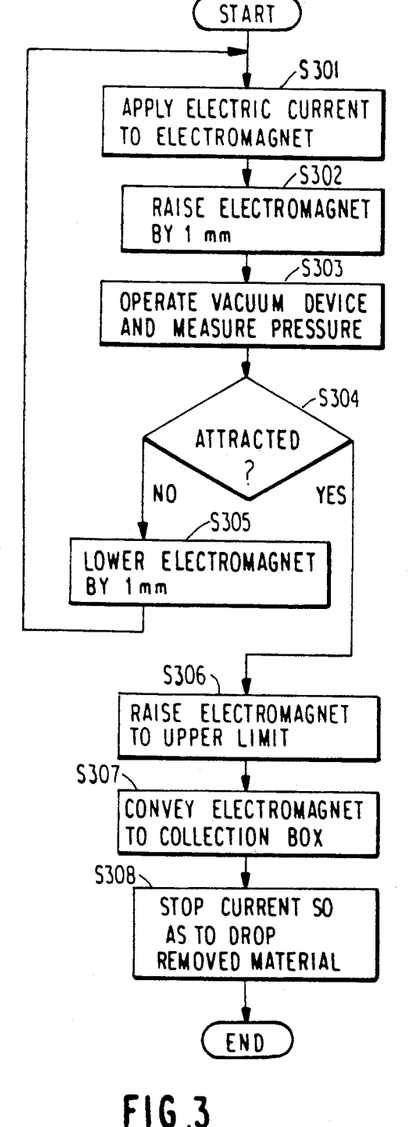
FIG. 3 is a flowchart showing the operation of the first embodiment of the present invention.

FIG. 3 is a flow chart illustrating the procedure for determining whether or not a core to be removed is close to electromagnet 5b. First an electric current is applied to electromagnet 5b so as to attract core material 20 spaced a distance of approximately 0.2 mm away from the electromagnet 5b (step S301) and electromagnet 5b is then raised 1 mm (step S302).

Then first solenoid valve 205 is closed and the second solenoid valve 207 is opened. In this state, vacuum device 212 is operated to tend to create a vacuum in air conduit 200 and the pressure in conduit 200 is measured by pressure gauge 213 (step S303). The result of the pressure measurement is inputted to first pressure analyzer 214 to judge whether or not core material 20 has been attracted to electromagnet 10 (step S304). If core material 20 is attracted to electromagnet 5b, opening 5a will be obstructed by core material 20. Therefore, a lowered pressure will be measured by pressure gauge 213.

On the other hand, if a core 20 is not attracted to electromagnet 5b, a space of 1 mm is defined between core material 20 and electromagnet 5b. This is because electromagnet 5b has previously been raised by 1 mm. Air is then introduced through the opening 5a so as to increase pressure in air conduit 200 as compared to the case where opening 5a is obstructed. Accordingly, it is possible to determine whether or not core material 20 is abutted against electromagnet 5b based upon the result of a measurement taken by pressure gauge 213.

If it has been determined that core material 20 has not been attracted to electromagnet 5b in step S304, electromagnet 5b is lowered 1 mm, or moved toward the core material 20, (step S305) and the processing returns to step S301. Then, the operations of steps S301, S302, S303, S304, and S305 are cyclically repeated until it is determined that core material 20 has been attracted to electromagnet 5b in step S304.

After it has been determined that core material 20 is attracted to electromagnet 5b in step S304, electromagnet 5b is raised to its upper limit (step S306). Then, upper arm 3 is rotated in response to a command from first nozzle position controller 30 so as to move electromagnet 5b to a position above the material collection box (step S307) and the application of electric current to the electromagnet 5b is terminated so as to drop core material 20 into the material collection box (step S308).

Upper arm 3 is thereafter rotated in a reverse direction in response to a command from first nozzle position controller 30 and returned to its initial position for the next cycle of operation.

Figure 4:
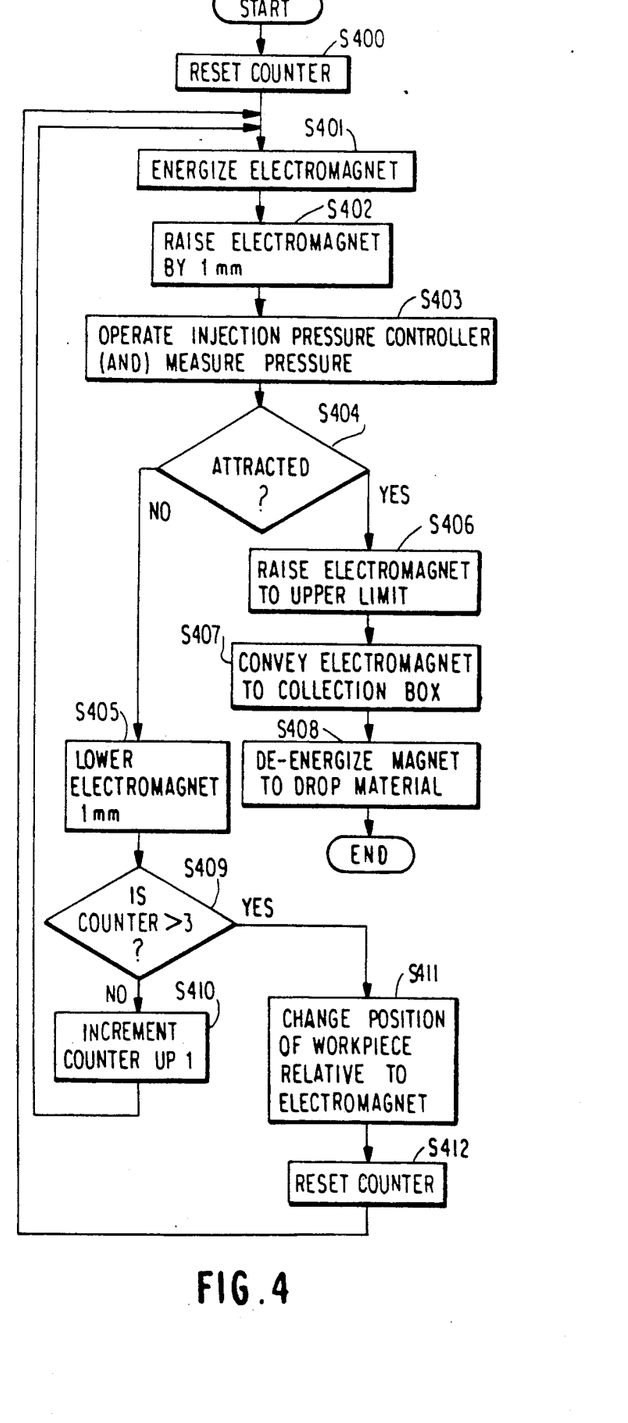
FIG. 4 is a flowchart showing the reiterative operation of the first embodiment.

FIG. 4 is a flow chart illustrating the operation of a counter (not shown) for determining how many iterations of steps S301 through S305 have been conducted. First the counter is reset to zero (step S400). Operations in steps S401 to S408 are identical to those in the steps S301 to S308 shown in FIG. 3.

Namely, when it has been determined that core material 20 is not attracted to electromagnet 5b in step S404 and electromagnet 5b is lowered 1 mm to approach core material 20 in step S405, it is determined whether the value of the counter is greater than a predetermined value, for example three, (step S409). If the value is equal to or less than three, the counter is incremented (step S410) and the processing returns to step 401. The predetermined value is determined based upon operator preferences and system variables.

If it is determined that the value of the counter is greater than three in the step S409, servo mechanisms (not illustrated) are driven so as to move upper nozzle 5, relative to X-Y table 8 in the X and/or Y direction by a predetermined distance. This results in a change of the position at which the core material is attracted to electromagnet 5b (step S411).

The counter is then reset (step S412), the program returns to step S401, and the procedure is executed again. If the attraction cannot be achieved by repeating the above operation a predetermined number of times, first nozzle position controller 30 causes an alarm to be displayed or sounded and terminates the programmed operation.

Figure 5:
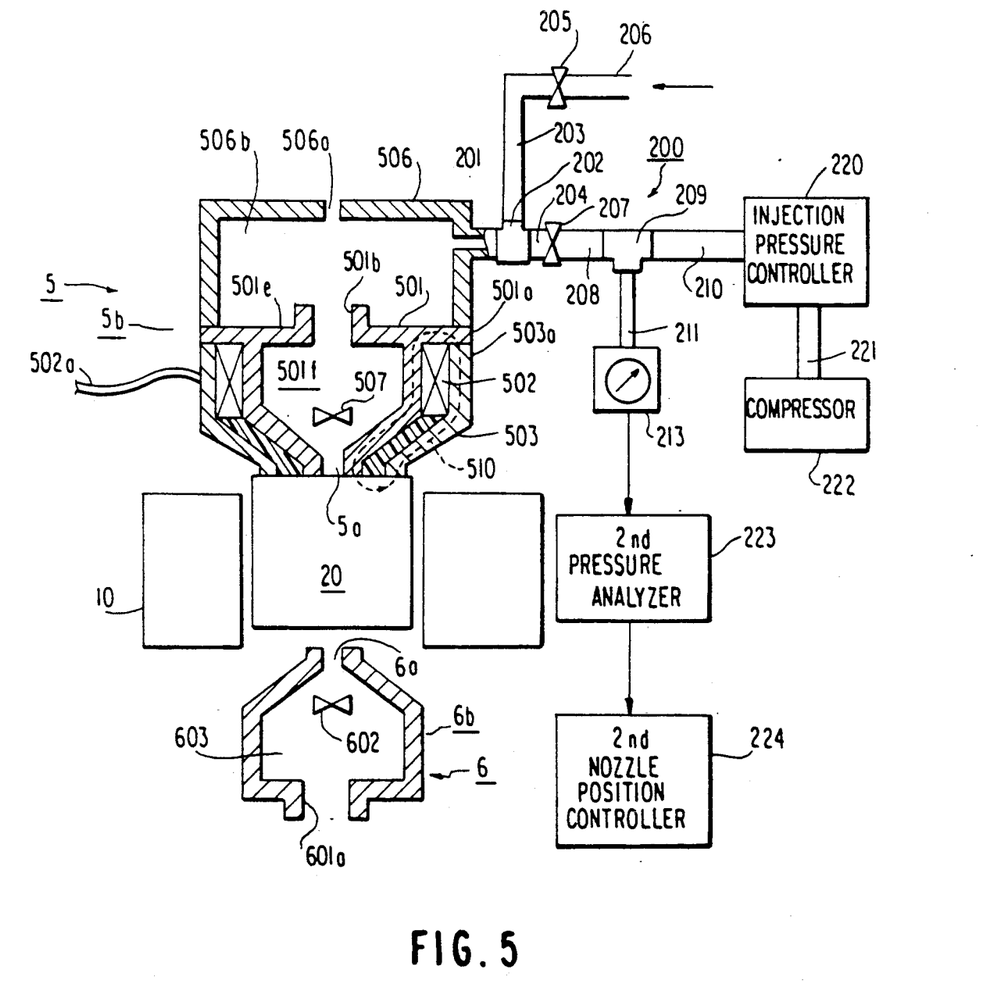
FIG. 5 is a sectional view of a second embodiment of the present invention.

FIG. 5 is a sectional view of a wire-type electric discharge machining system according to a second embodiment of the present invention. In FIG. 5, parts identical to those in FIG. 2 are assigned like reference characters and will be not described further.

Injection pressure controller 220 is connected to an end of pipe 210. Pipe 221 has one end connected to injection pressure controller 220, and the other end connected to compressor 222. Compressor 222 injects air, or another fluid into pipe 221. Injection pressure controller 220 regulates the pressure of the air injected by the compressor 222 so as to correspond to a force that is lower than the attraction force of electromagnet 5b of upper nozzle 5, and allows air of this controlled pressure to enter pipe 210.

When first solenoid valve 205 is closed, second solenoid valve 207 is opened, and compressor 222 is started. Pressure gauge 213 measures pressure in air conduit 200 which comprises hollow portion 501f of inner portion 501 in upper nozzle 5, hollow portion 506b of connecting portion 506, pipe 201, joint 202, pipe 203, pipe 204, second solenoid valve 207, pipe 208, joint 209, pipe 210 and pipe 211.

Second pressure analyzer 223 determines whether or not electromagnet 5b has attracted core material 20 according to the output of pressure gauge 213. In addition, second pressure analyzer 223 determines whether electromagnet 5b is proximate core material 20. The output of second pressure analyzer 223 is transmitted to second nozzle position controller 224.

Figure 6:
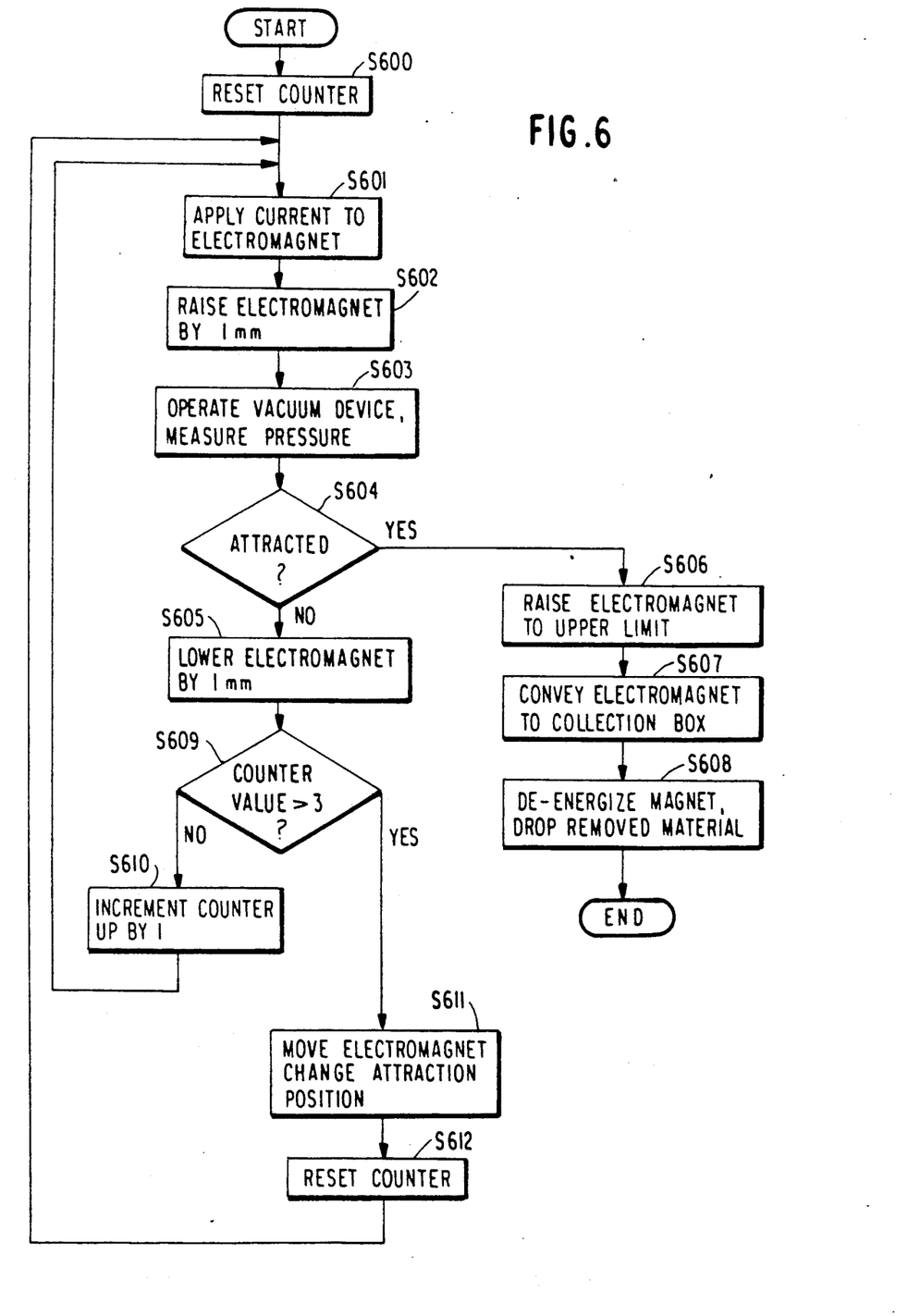
FIG. 6 is a flowchart showing the operation of the second embodiment.

The operation of the second preferred embodiment will now be described in accordance with an operation flowchart in FIG. 6 and with reference to FIG. 5.

First, when core material 20 is completely separated from workpiece 10, wire electrode 11 is removed. Then, after first solenoid valve 205 is closed and the second solenoid valve 207 is opened, a counter (not illustrated) is reset to zero (step S600). The counter is adapted to count how many times the procedure of applying an electric current to the electromagnet 5b is carried out without attraction of core material 20.

An electric current is then applied to electromagnet 5b so as to attract core material 20 spaced approximately 0.1 mm away from electromagnet 5b (step S601) and electromagnet 5b is raised 1 mm (step S602).

Then second nozzle position controller 224 activates injection pressure controller 220 which regulates the pressure from compressor 222 to correspond to a force that is lower than the attraction force of electromagnet 5b, and at the same time, injects air into air conduit 200. Pressure gauge 213 measures the pressure in conduit 200 (step S603).

The result of this measurement taken by pressure gauge 213 is used by second pressure analyzer 223 to determine whether or not core material 20 is attracted to the electromagnet 5b (step S604).

The air injected into conduit 200 by compressor 222 is discharged from conduit 200 through opening 506a and opening 5a. If core material 20 is attracted to electromagnet 5b so as to obstruct opening 5a, the pressure in conduit 200 rises. On the other hand, when core material 20 is not attracted to electromagnet 5b, a space of 1 mm is provided between core material 20 and electromagnet 5b because electromagnet 5b has been raised 1 mm. Air is then discharged through opening 5a so as to decrease the pressure in conduit 200 as compared to the case where opening 5a is obstructed. With electromagnet 5b raised by a small distance of 1 mm, it is possible to determine whether or not core material 20 has been attracted to electromagnet 5b by using the results of a measurement taken by pressure gauge 213.

When it has been determined that core material 20 has not been attracted to electromagnet 5b in step S604, electromagnet 5b is lowered 1 mm so as to approach core material 20 (step S605) and the reiterative operation described below is performed.

When it has been determined that core material 20 has been attracted to electromagnet 5b in step S604, electromagnet 5b is raised to its upper limit (step S606). Then, upper arm 3 is rotated according to a command from second nozzle position controller 224 so as to move electromagnet 5b to a position above the collection box (step S607). Electromagnet 5b is then de-energized and simultaneously the injection pressure is increased by injection pressure controller 220 so as to drop core material 20 into the collection box (step S608).

Upper arm 3 is thereafter rotated in an opposite direction according to a command from second nozzle position controller 224 and returns to its initial position for the next cycle of operation.

The reiterative operation which is performed when it has been determined that the core material 20 has not been attracted to electromagnet 5b in step S604 will now be described. In particular, when electromagnet 5b is lowered 1 mm in step S604 so as to approach core material 20, it is then determined whether or not the value of the counter is greater than three (step S609). If the value is equal to or less than three, the retrial counter is counted up one increment (step S610) and the processing returns to step S601. Then, the operation of steps S601, S602, S603, S604, S605, and S609, is repeated until it is found that the value of the retrial counter reaches three or that core material 20 has been attracted to electromagnet 5b in step S604.

If it has been determined that the value of the counter is greater than three in the step S609, servos (not illustrated) are driven to move upper nozzle 5 relative to X-Y table 8 in the X-Y direction, by a predetermined distance, thereby changing the position at which the core material is attracted (step S611).

The counter is then reset to zero (step S612), the processing returns to step S601, and the operation is performed again. If the attraction cannot be achieved by repeating the above retry operation a predetermined number of times, second nozzle position controller 224 sounds or displays an alarm and terminates the operation.

In step S611, the position at which the core material is attracted may be changed either continuously or intermittently over a predetermined period of time. During that period, pressure gauge 213 either continuously or intermittently measures pressure in conduit 200. A new position of attraction may be determined at a position at which conduit 200 has a maximum pressure.

In the embodiments shown in FIGS. 3, 4 and 5, it is determined whether core material 20 is attracted to electromagnet 5b. It is also possible to determine whether core material 20 is dropped after it has been attracted to electromagnet 5b, based on the result of measurements taken by pressure gauge 213. Specifically, the output of pressure gauge 213 is either continuously or intermittently monitored after core material 20 has been attracted to electromagnet 5b.

According to the first embodiment, it is determined that core material 20 has been dropped if the pressure has risen above a predetermined level. According to the second embodiment, it is determined that core material 20 has dropped if the pressure has fallen below a predetermined level. The system is then stopped immediately in case core material 20 has been dropped between movable and immovable components of the system, thereby protecting the system from damage.

Further, when electromagnet 5b is moved toward core material 20, the volume of air flowing through opening 5a of upper nozzle 5 changes and the pressure in conduit 200 is correspondingly varied. As such, it is possible to prevent inadvertent contact of electromagnet 5b with core material 20, or other components, by monitoring the result of measurements taken by the pressure gauge 213. That is, when the pressure in conduit 200 has fallen below a predetermined level in the first embodiment, or when the pressure in conduit 200 has risen above a predetermined level in the second embodiment, movement of electromagnet 5b is automatically stopped so as to prevent such inadvertent contact.

In the embodiments shown in FIGS. 3, 4 and 5, opening 5a forms an aperture through which a jet of machining liquid is directed and through which air is introduced. Alternatively, a separate air hole may be formed either within or adjacent electromagnet 5b to which core material 20 is attracted.

Also, in both of the embodiments shown in FIGS. 1, 2 and 5, the upper nozzle 5 includes electromagnet 5b consisting of inner core 501 wrapped by coil 502 and the outer core 503 provided in a coaxial relationship to each other, and is designed to inject a jet of machining liquid from hollow portion 501f of inner core 501. Alternatively, the machining liquid may be injected outside of electromagnet 5b, and the nozzle portion may be separate from the electromagnet portion.

With the present invention thus constructed, once the core material is attracted to electromagnet 5b, the air hole moving in conjunction with the electromagnet is blocked up by core material 20, thereby changing the pressure in conduit 200 which is generated by vacuum device 212 or injection means 222 and flows through the hole 5a. Based on this change in pressure, it is determined whether core material 20 is attracted to electromagnet 5b. Accordingly, the present invention has the advantage of fully detecting such attraction of core material 20, even if core material 20 is small, wherever the core material is located.

It is also possible to determine whether or not core material 20 is dropped after it has been initially attracted by electromagnet 5b. When it is found that core material 20 is dropped from electromagnet 5b during transfer, electromagnet 5b is stopped immediately. This prevents core material 20 when dropped between the movable and stationary components of the system from doing any damage to the system.

What is claimed is:

1. A wire-type electric discharge machining system comprising:
   an electromagnet operable to attract a material cut from a workpiece during a machining operation;
   an air hole movable in concert with said electromagnet relative to said workpiece, so that said air hole is obstructed when said material is attracted to said electromagnet;
   a vacuum device for providing a flow of air through said air hole;
   a pressure measuring device for measuring pressure in said vacuum device, said vacuum device tending to reduce pressure within itself;
   first pressure determining means for determining whether said material is attracted to said electromagnet based upon the result of measurement taken by said pressure measuring device; and
   first transfer control means for predeterminately moving said electromagnet relative to said workpiece based on the result of determination of said first pressure determining means.

2. A wire-type electric discharge machining system according to claim 1, wherein said first transfer control means is operable to determine whether said electromagnet is proximate said material based upon the result of measurement of said pressure measuring device, and stop said electromagnet when it is determined that said electromagnet is located proximate said material.

3. A wire-type electric discharge machining system according to claim 1, wherein said first transfer control means is operable to determine whether said material has been attracted to said electromagnet or not based upon the output of said pressure measuring device when said electromagnet has lifted said material in a direction orthogonal to a surface of said workpiece by a predetermined distance after attempting to attract said material and to cause said electromagnet to attempt to attract said material again if it is determined that said material has not been attracted.

4. A wire-type electric discharge machining system according to claim 3, wherein said first transfer control means is operable to cause said electromagnet to attempt to remove said material again after moving said electromagnet relative to said workpiece in a direction parallel to said surface of said workpiece by a predetermined distance.

5. A wire-type electric discharge machining system according to claim 4, wherein said pressure measuring device measures pressure one of continuously and intermittently when said position of attraction is changed and the attraction of the workpiece performed in a position where a pressure value is one of a minimum and below a predetermined value.

6. A wire-type electric discharge machining system comprising:
   an electromagnet operable to attract a material cut from a workpiece during a machining operation;
   an air hole movable in concert with said electromagnet relative to said workpiece, so that discharge of air through said air hole is inhibited when said material is attracted to said electromagnet;
   a pressure generating device for discharging air from said air hole;
   a pressure gauge for measuring the pressure of air flowing through said air hole;
   pressure determining means for determining whether the material is attracted to said electromagnet based on the result of measurement taken by said pressure gauge; and
   transfer control means for moving said electromagnet relative to said workpiece based on the result of a determination by said pressure determining means.

7. A wire-type electric discharge machining system according to claim 6, wherein said transfer control means is operable to determine whether said electromagnet is moved toward said material based on the result of measurement of said pressure gauge and to stop said electromagnet when it is determined that said electromagnet is moved proximate said material.

8. A wire-type electric discharge machining system according to claim 6, wherein said transfer control means is operable to determine whether or not said material has been attracted to said electromagnet based upon the output of said pressure gauge when said electromagnet has lifted said material in a direction orthogonal to a surface of said workpiece by a predetermined distance after attempting to attract said material and cause said electromagnet to attract said material again if it is determined that said material has not been attracted.

9. A wire-type electric discharge machining system according to claim 8, wherein said transfer control means is operable to attempt to attract said material again after moving said electromagnet relative to said workpiece, in a direction parallel to said surface of said workpiece by a predetermined distance, stopping said electromagnet, and changing a position of attraction.

10. A wire-type electric discharge machining system according to claim 9, wherein said pressure gauge measures pressure one of continuously and intermittently when said position of attraction is changed.

11. A wire-type electric discharge machining system according to claim 1 or 10, wherein said electromagnet includes inner and outer cores both made from a magnetic material, and a coil wound around said inner core, said outer core being spaced from said inner core, and wherein said inner core and said outer core each have one end adapted to attract said material and another end magnetically connected together.

12. A wire-type electric discharge machining system according to claim 11, wherein a jet of machining liquid is directed from said inner core of said electromagnet.

13. A wire-type electric discharge machining system according to claim 12, wherein said inner core has an opening at one end where said material is attracted to said electromagnet, said air hole being located in said opening.

* * * * *